United States Patent
Balogh et al.

(10) Patent No.: US 8,457,856 B2
(45) Date of Patent: Jun. 4, 2013

(54) PARAMETER ESTIMATION METHOD FOR SELF-ENERGIZED BRAKE MECHANISM

(75) Inventors: Levente Balogh, Szigetszentmiklos (HU); Huba Nemeth, Budapest (HU)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 12/949,964

(22) Filed: Nov. 19, 2010

(65) Prior Publication Data

US 2011/0125380 A1 May 26, 2011

Related U.S. Application Data

(63) Continuation of application No. PCT/EP2009/003598, filed on May 20, 2009.

(30) Foreign Application Priority Data

May 21, 2008 (EP) ..................................... 08009347

(51) Int. Cl.
*B60T 8/172* (2006.01)

(52) U.S. Cl.
USPC ................. 701/70; 701/76; 702/182; 702/41; 73/121; 188/1.11 W; 188/1.11 E; 188/1.11 R

(58) Field of Classification Search
USPC .................... 701/70, 76; 188/1.11 W, 1.11 E, 188/1.11 R; 702/182, 41; 73/121
See application file for complete search history.

(56) References Cited

U.S. PATENT DOCUMENTS

| 5,775,782 | A * | 7/1998 | Akita et al. ...................... 303/10 |
| 6,318,513 | B1 * | 11/2001 | Dietrich et al. .............. 188/72.7 |
| 7,347,304 | B2 * | 3/2008 | Nilsson et al. ................ 188/158 |
| 2007/0085414 | A1 | 4/2007 | Henry et al. |
| 2009/0152054 | A1 | 6/2009 | Baumgartner et al. |
| 2009/0164172 | A1 * | 6/2009 | Hartmann et al. ............ 702/182 |
| 2010/0168979 | A1 * | 7/2010 | Baier-Welt et al. ............ 701/76 |

FOREIGN PATENT DOCUMENTS

| DE | 10 2004 008 383 A1 | 9/2005 |
| EP | 0 205 277 A2 * | 5/1986 |
| EP | 0 297 485 A2 | 1/1989 |
| WO | WO 03/036121 A1 | 5/2003 |
| WO | WO 2006/100539 A1 | 9/2006 |
| WO | WO 2007/073927 A1 | 7/2007 |

OTHER PUBLICATIONS

Lin et al., Neural-Network Hybrid Control for Antilock Braking Systems, Mar. 2003, IEEE, vol. 14, No. 2, pp. 351-359.*
Unsal et al., Sliding Mode Measurement Feedback Control for Antilock Braking Systems, Mar. 1999, vol. 7, No. 2, pp. 271-281.*

(Continued)

*Primary Examiner* — Thomas Black
*Assistant Examiner* — Sara Lewandroski
(74) *Attorney, Agent, or Firm* — Crowell & Moring LLP

(57) ABSTRACT

A method estimates parameters for a self-energized brake mechanism having a moving part, a brake pad, a brake disc, a caliper, and a wedge profile. The method includes the following acts: applying the same actuator force to the brake mechanism and simultaneously to a dynamical model of the brake mechanism; calculating deviations based on measured state variables of the brake mechanism and simulated state variables of the dynamical model; and producing the estimated parameters by online minimization. A device is provided for executing the method.

8 Claims, 2 Drawing Sheets

OTHER PUBLICATIONS

Lin et al., Neural-Network Hyrbid Control for Antilock Braking Systems, Mar. 2003, IEEE, vol. 14, No. 2, pp. 351-359.*

Alex, Charles Joseph IV, Comparison of Strategies for the Constraint Determination of Simulink Models, May 2007, Thesis, University of Montana.*

Holzmann et al., Vehicle Dynamics Simulation Based on Hybrid Modeling, Sep. 12-23, 1999, IEEE, pp. 1014-1019.*

Sakamoto, Taizo et al., "Cooperative Control of Full Electric Braking System With Independently Driven Four Wheels", Advanced Motion Control, 2006 9$^{th}$ IEEE International Workshop on Mar. 2006, Piscataway, NJ, USA, IEEE, Mar. 1, 2006, pp. 602-606, XP010918245.

Balogh, L. et al., "Modelling and simulating of self-energizing brake system", Vehicle System Dynamics, Jan. 1, 2006, pp. 368-377, vol. 44, Supplement, XP009108601.

European Search Report dated Nov. 20, 2008 (Seven (7) pages).

International Search Report dated Aug. 17, 2009 (Three (3) pages).

* cited by examiner

PARAMETER ESTIMATION METHOD FOR SELF-ENERGIZED BRAKE MECHANISM

CROSS-REFERENCE TO RELATED APPLICATIONS

This application is a continuation of PCT International Application No. PCT/EP2009/003598, filed May 20, 2009, which claims priority under 35 U.S.C. §119 from European Patent Application No. EP 08009347.9, filed May 21, 2008, the entire disclosures of which are herein expressly incorporated by reference.

BACKGROUND AND SUMMARY OF THE INVENTION

The present invention relates to a parameter estimation method for a self-energized brake mechanism, and a device for executing such a method.

With conventional disc brake mechanisms the frictional brake force has no feedback to the actuator force or the clamping force. This means that the brake mechanism is not capable of determining any relation between the clamping force and the friction force. However, in case of self-amplified wedge brakes, where one part of the actuation energy is generated from the friction force, the friction coefficient can be reconstructed because the friction force has a direct feedback to the actuator movement.

In conventional commercial vehicle brake systems, the control feedback is the pressure which has a good relation to the clamping force. In this case, the value of an air gap between a brake pad and a brake disc influences the relation only marginally, so it is taken into consideration via threshold pressure. In self-amplifying brake mechanisms, the air gap between the brake pad and the brake disc has a more significant influence so its value is also useful information for a brake controller.

With self energized wedge brakes, considering the cost optimal realization, the friction force cannot be measured effectively in direct ways, moreover, the clamping force, being the analogous signal to the brake pressure of current brakes, is also not always measured by sensors. However, the friction coefficient is one of the most important parameters (a disturbance signal) of the system since it determines the magnitude of the self-amplification as well as being a further factor between the clamping force and the friction force. Thus the friction coefficient needs to be reconstructed from the other measured signals.

In the case of the electro-mechanical brake systems, the actuator position can be easily measured (e.g. as a motor position), which has a certain correlation with the clamping force. However, this correlation contains a new uncertainty, namely the air gap between a brake pad and a brake disc. This disturbance signal should also be reconstructed in order to adjust low brake force levels accurately if there is no direct clamping force measurement.

WO 2007/073927 A1 describes a method for determining the friction value of a disc brake, in particular of self-energizing disc brakes. The determination of the friction value is carried out mathematically on the basis of the following variables: motor current for the application and retraction directions; idle current; wedge angle; transmission constant and clamping force.

WO 2003/036121 A1 shows a self-energizing electromechanical disc brake comprising a rotatable brake disc and an electric actuator that generates an actuating force acting on a friction lining via a wedge system against the brake disc. Also provided is a device for detecting the moment of friction, which comprises first means for measuring the friction force and second means for detecting the force perpendicular to the brake disc, or first means for detecting the force of the actuator and second means for detecting the force perpendicular to the brake disc.

These solutions for friction coefficient estimation calculate the estimate based on static relations and on the assumption that the static load of the actuator can be separated from the dynamic load in practice as well.

Methods for estimating a torque/force exerted by a load against an actuator driven by an electric motor against the load are described in US 2007/0085414 A1. A first method includes measuring motor current of the electric motor and measuring a position/angle or speed/angular speed of the actuator and includes calculating the torque/force exerted by the load against the actuator using at least a difference between a calculated motor torque/force and a calculated actuator-experienced torque/force. The effect of the load is a "Disturbance Torque" calculated as an "Observed Disturbance Torque" and can be mathematically converted and then used as an "Observed Disturbance Force" by a controller to compute an "Input Voltage" to the electric motor to control the brake. A second method includes measuring input voltage of the electric motor instead of measuring motor current, and a third method includes measuring both motor current and input voltage. The actuator is an automotive electromechanical brake caliper. The methods use mathematical models of the actuator. The mathematical models are mathematical models of the mechanical aspects of the electromechanical actuator. Estimating the actuator load can be a disadvantage due to time consuming calculation time.

In view of the above, it is an object of the present invention to provide an improved parameter estimation method for a self-energized brake mechanism. Another object of the present invention is to provide an improved device for executing such a method.

According to the present invention, this object is achieved with a method for estimating parameters for a self-energized brake mechanism having a moving part, a brake pad, a brake disc, a caliper, and a wedge profile, the method including the following steps: applying the same actuator force to the brake mechanism and simultaneously to a dynamical model of the brake mechanism; calculating deviations based on measured state variables of the brake mechanism and simulated state variables of the dynamical model; and producing the estimated parameters by online minimization.

According to the present invention, this object is also achieved with a device for parameter estimation for a self-energized brake mechanism having a moving part, a brake pad, a brake disc, a caliper, and a wedge profile, the device including: a brake mechanism with measuring device for state variables; a dynamical model for calculating simulated state variables; a deviation unit for comparing the measured state variables and the simulated state variables; and a minimization unit for providing estimated parameter values, wherein inputs of the brake mechanism and the dynamical model are connected in parallel and outputs of the minimization unit are connected with the dynamical model for feedback.

The estimation of the parameters of a self-amplifying brake system uses the properties of the self-energized brake system and does not contain any intermediate step for estimating the actuator load. Therefore, the method of the present invention is capable of covering any stationary or transient situation and saves calculation time.

The method is based on the dynamical model of the system. The same actuator force input to the dynamical model as to the real brake mechanism is applied simultaneously. Therefore, only one input value is needed.

At least the position of the moving part is measured, and optionally the speed thereof; otherwise the actuator speed is reconstructed from the measured position. A calculation of deviation norms based on the measured and simulated state variables is executed.

The parameters of the model, to which the system is sensitive like friction coefficient and air gap, are adjusted, which provides the main output of the estimated parameters in order to minimize the deviation norm. The estimated parameters are fed back to the dynamical model in order to obtain an optimized output.

It is a parameter identification method which can be executed in the brake controller online in real-time. Furthermore, the method can be applied for non self-amplifying brakes as well as for estimation of the air gap only.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
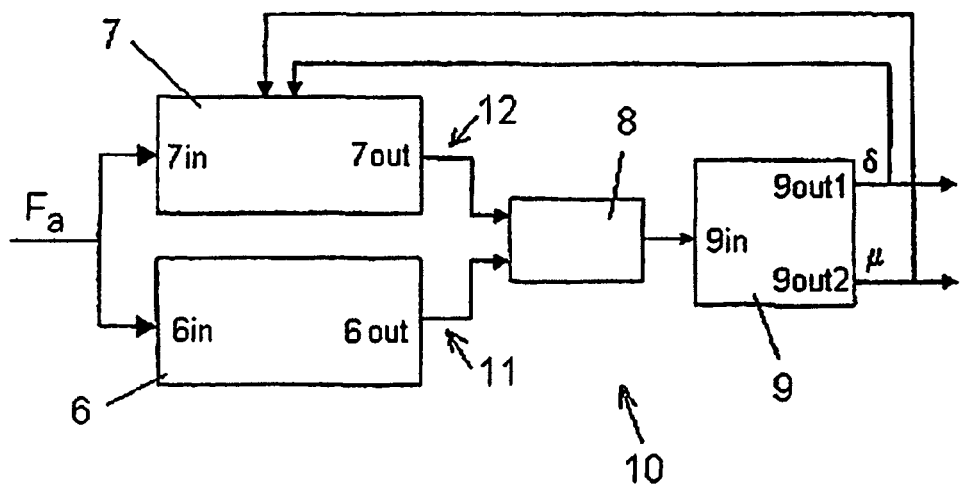
FIG. 1 shows a first exemplary schematic embodiment of a device for executing a parameter estimation method for a self-energized brake mechanism according to the invention.

FIG. 1 shows a first exemplary schematic embodiment of a device 10 for executing a parameter estimation method for a self-energized brake mechanism. The device 10 includes, a brake mechanism 6, a dynamical model 7 of the brake mechanism 6, a deviation unit 8 and an online minimization unit 9. An input 6*in* of the brake mechanism 6 and an input 7*in* of the dynamical model 7 are connected in parallel and receive the same actuator force $F_a$ (or torque). An output 6*out* of the brake mechanism 6 and an output 7*out* of the dynamical model 7 are connected to inputs of the deviation unit 8. An output of the deviation unit 8 is connected to an input 9 in of the minimization unit 9. An output 9*out*1 and another output 9*out*2 of the minimization unit 9 are connected to the dynamical model 7.

The dynamical model 7 of the brake mechanism 6 is calculated in parallel with the operation of the actual device, i.e., the brake mechanism 6. The dynamical model 7 receives the same actuator force $F_a$ (or torque) that is applied to the input 6*in* of the brake mechanism 6. So, the dynamical model 7 should produce the same (simulated) state variable values 12 on its output 7*out* as measured on the real brake mechanism 6. The measured state variables 11 are available at the output 6*out* of the brake mechanism 6.

The measured state variables 11 and the simulated state variables 12 are fed to the deviation unit 8. The deviation unit 8 calculates a deviation between the simulated state variables 12 and the measured state variables 11. The deviation is caused by the uncertain parameters of the model, which are the friction coefficient μ and the air gap δ in this case. This means that the amount of the error has a relationship with the uncertain parameters which can be readjusted based on the magnitude and the behavior of the error. This error deviation is fed to the input 9*in* of the minimization unit 9. The online minimization unit 9 realizes this functionality and determines the parameter setting of the dynamical model 7 for the next execution step based on the deviation in the current execution step.

Figure 2:
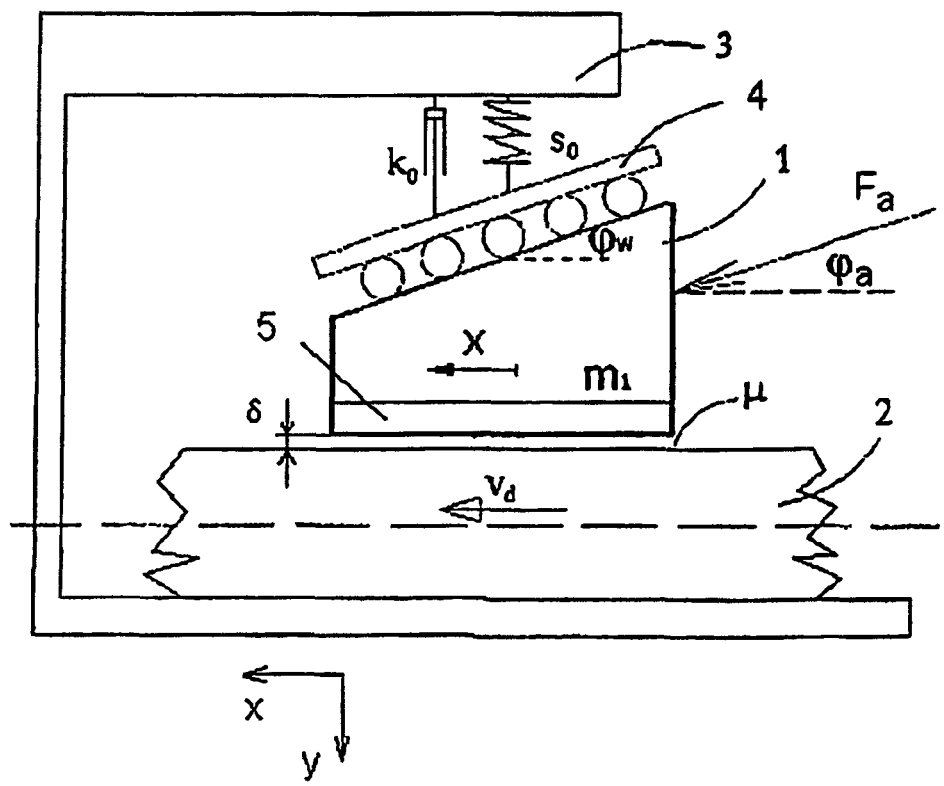
FIG. 2 illustrates an exemplary simplified dynamic model of a wedge brake mechanism.

As an exemplified model of a wedge brake mechanism, the dynamical model 6 has to use a simplified dynamic model that can be evaluated in real-time. This dynamic model is shown in FIG. 2 together with a coordinate system x, y, wherein the x-direction is parallel to the moving direction of a moving element 1 with a brake pad 5 and the y-direction is perpendicular to the x-direction.

An actuator force $F_a$ acts on the moving element 1 of the system. The moving element 1 represents the actuator path together with the brake pad 5. The moving element 1 is connected to a caliper 3 through a wedge profile 4. The moving element 1 includes the brake pad 5, which acts on a brake disc 2. This example shows the brake disc 2 rotating in x-direction with a speed $V_d$. The brake force is produced between the moving element 1 and the brake disc 2 after an air gap δ has been reduced and eliminated by a movement $X_a$ of the moving element 1 created by the actuator force $F_a$. The necessary variables to be measured are the actuator position and the actuator force as an input (based on the currents of the actuator).

In this system two significant parameters can be defined to which the model is sensitive and which are uncertain and not measurable. These parameters are the friction coefficient μ and the air gap δ between the disc 2 and the brake pad 5.

The dynamical model 7 (see FIG. 1) can be described by the following state equation:

$$\begin{bmatrix} \dot{x}_a \\ \dot{v}_a \end{bmatrix} = \begin{bmatrix} f_1(x) \\ f_2(x,d) \end{bmatrix} + \begin{bmatrix} g_1 \\ g_2 \end{bmatrix} u$$

where the state and input coordinate functions are as follows:

$$f_1(x) = v_a,$$

$$f_2(x,d) = \frac{(k_0 v_a \tan\varphi_w + s_0(x_a \tan\varphi_w - \delta))(\mu\cos\varphi_w - \sin\varphi_w)}{m_1},$$

$$g_1 = 0,$$

$$g_2 = \frac{1}{m_1 \cos\varphi_a}.$$

The state vector includes the position and the speed of the moving element 1:

$$x = \begin{bmatrix} x_a \\ v_a \end{bmatrix}.$$

The input vector includes the actuating force only:

$$u = [F_a].$$

The disturbance vector comprises the two uncertain time dependent parameters, namely the friction coefficient μ and the air gap δ:

$$d = \begin{bmatrix} \mu \\ \delta \end{bmatrix}.$$

Finally, the rest of the variables in the coordinate equations are the parameters of the model as follows: damping coefficient $k_0$ of the caliper 3, reduced stiffness $s_0$ of the caliper 3, wedge angle $\phi_w$, actuator force angle of attack $\phi_a$ and the mass ml of the moving element 1.

The simulated state variables $X_a$, $V_a$ are then compared to the measured ones and a relative deviation is formed as follows:

$$\varepsilon_{V_a} = \frac{V_{a_{mes}} - V_{a_{sim}}}{V_{a_{max}}},$$

$$\varepsilon_{X_a} = \frac{X_{a_{mes}} - X_{a_{sim}}}{X_{a_{max}}}.$$

In the example, the speed of the moving element 1 is not measured, just the position. Then, the speed can be reconstructed from it (e.g.: by derivation, by a PLL filter, etc.). Of course, if the speed is available from measurement, then it can/has to be used in the above deviation norms.

Finally, a summed weighted deviation is calculated:

$$\varepsilon_c = (w_{x_a}\varepsilon_{x_a} + w_{v_a}\varepsilon_{v_a}).$$

Based on the sum deviation there are many possibilities for the online minimization step to produce estimations for the disturbance signals, namely the friction coefficient μ and the air gap δ. Some examples are the gradient method or the simplex method. Another simple example where these estimates are changed by a proportional and an integral portion of the sum deviation is as follows:

$$\mu_{n+1} = (P_\mu \varepsilon_c + I_\mu \int \varepsilon_c dt) + \mu_n,$$

$$\delta_{n+1} = -(P_\delta \varepsilon_c + I_\delta \int \varepsilon_c dt) + \delta_n.$$

In this case P and I are the minimization parameters which can influence the estimation performance. However, the simultaneous adjustment of these two parameters cannot always provide optimal performance.

A solution for this problem can be if the two parameters are adjusted alternately in time, which means that one of the two uncertain parameters is constant during the estimation of the other one. The alternation can be time based or conditional based. If it is time based, the estimation is switched in each time step from the first parameter to the second.

The conditional switching means that the actual parameter to be estimated can be selected based on its effect in the actual condition. For example, if the brake disc 2 is stopped, the friction force is zero and it does not affect the actuation. So in this case only the air gap δ should be estimated. But if the brake disc 2 rotates, the air gap δ parameter could be constant and the friction coefficient μ can be adjusted based on the error.

A second solution can use the dependency of the friction coefficient μ on the air gap δ. It means that in the air gap δ the estimated friction coefficient μ will be zero because there is no contact between the brake pad 5 and the brake disc 2. In this way, the air gap δ can be calculated from the actuator position value when the estimated friction value jumps up from zero (see FIG. 3).

Figure 3:
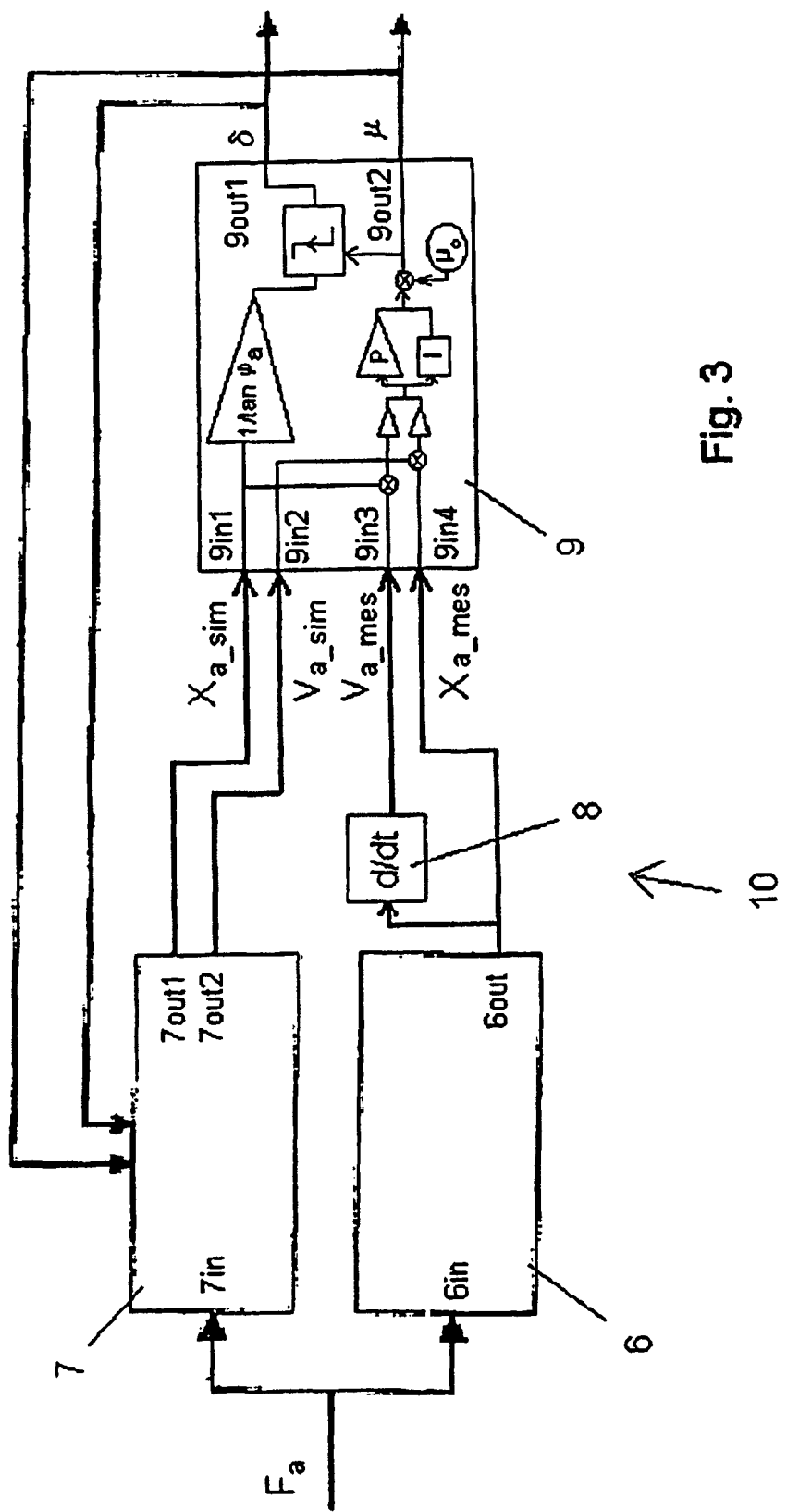
FIG. 3 shows a second exemplary schematic embodiment of the device for executing the parameter estimation method according to the present invention.

FIG. 3 shows a second exemplary schematic embodiment of the device 10 for executing the parameter estimation method according to the present invention. The input 6in of the brake mechanism 6 and the input 7in of the dynamical model are connected in parallel similar to the first embodiment shown in FIG. 1. The inputs 6in and 7in receive the actuator force $F_a$ (or the torque) simultaneously.

Output 7out1 provides the simulated state variable $X_{a\_sim}$ to an input 9in1 of the minimization unit 9. Output 7out2 provides the simulated state variable $V_{a\_sim}$ to an input 9in1 of the minimization unit 9. The output 6out transmits the measured state variable $X_{a\_mes}$ to the deviation unit 8 and to an input 9in4 of the minimization unit 9. The deviation unit 8 provides the measured state variable $V_{a\_mes}$ and feeds it to an input 9in3 of the minimization unit 9.

In this example, the minimization unit 9 is shown by way of example only and not to be limiting.

The measured and simulated variables are processed in various functional units as mentioned above.

An estimated value of the air gap δ is provided at an output 9out1 and an estimated value of the friction coefficient μ is provided at another output 9out2. Both are fed back to the dynamical model 7.

In a special case, when the system is not self-energized, i.e. the wedge angle $\phi_w$ equals 90°, then the air gap δ can only be estimated.

The main characteristics of the present invention are as follows:

An estimation of the parameters of self-amplifying brake system:
based on the dynamical model of the system,
providing the same actuator force input to the dynamical model as to the real brake mechanism,
measuring at least the position of the moving part, and optionally the speed thereof; otherwise the actuator speed is reconstructed from the measured position,
calculation of deviation norms based on the measured and simulated state variables,
adjusting the parameters of the model, to which the system is sensitive like friction coefficient and air gap, which provides the main output of the estimated parameters in order to minimize the deviation norm,
feeding back the estimated parameters to the dynamical model;
The method is capable to cover any stationary or transient situation It is a parameter identification method which can be executed in the brake controller online in real-time. The method can be applied for non self-amplifying brakes as well as for estimation of the air gap only.

Table of Reference Numerals

Moving part
Brake disc
Caliper
Wedge profile
Brake pad
Brake mechanism
Dynamical model of the brake mechanism
Deviation unit
Online minimization unit
Device
Measured state variables
Simulated state variables
6in Input brake mechanism
6out Output brake mechanism
7in Input dynamical model
7out, 7out1, 7out2 Output dynamical model
9in1, 9in2, 9in3, 9in4 Input minimization unit
9out1, 9out2 Output minimization unit -continued Table of Reference Numerals x, y coordinates The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for estimating parameters for a self-energized brake mechanism having a moving part, a brake pad, a brake disc, a caliper, and a wedge profile, the method comprising the acts of:
  applying a same actuator force to the brake mechanism and simultaneously to a dynamical model of the brake mechanism;
  calculating deviations based on measured state variables of the brake mechanism and simulated state variables of the dynamical model; and
  producing the estimated parameters by online minimization,
wherein
  the parameters are a friction coefficient and an air gap of the brake pad and the brake disc,
  the act of calculating deviations comprises the acts of: calculating relative deviations:

$$\varepsilon_{v_a} = \frac{v_{a_{mes}} - v_{a_{sim}}}{v_{a_{max}}},$$

$$\varepsilon_{x_a} = \frac{x_{a_{mes}} - x_{a_{sim}}}{x_{a_{max}}},$$

and calculating a summed weighted deviation:

$$\epsilon_c = (w_{x_a}\epsilon_{x_a} + w_{v_a}\epsilon_{v_a}),$$

the dynamical model is:

$$\begin{bmatrix} \dot{x}_a \\ \dot{v}_a \end{bmatrix} = \begin{bmatrix} f_1(x) \\ f_2(x,d) \end{bmatrix} + \begin{bmatrix} g_1 \\ g_2 \end{bmatrix} u$$

where state and input coordinate functions are as follows:

$$f_1(x) = v_a,$$
$$f_2(x,d) = \frac{(k_0 v_a \tan\varphi_w + s_0(x_a \tan\varphi_w - \delta))(\mu\cos\varphi_w - \sin\varphi_w)}{m_1},$$
$$g_1 = 0,$$
$$g_2 = \frac{1}{m_1 \cos\varphi_a}$$

the online minimization is provided by a proportional and an integral portion of the sum deviation:

$$\mu_{n+1} = (P_\mu \epsilon_c + I_\mu \int \epsilon_c dt) + \mu_n,$$

$$\delta_{n+1} = -(P_\delta \delta_c + I_\delta \int \epsilon_c dt) + \delta_n,$$

where P and I are minimization parameters, and the estimated parameters are adjusted alternately in time.

2. The method according to claim 1, wherein one of: (a) a speed of the moving part is measured, and (b) a position of the moving part is measured and the speed is reconstructed from the measured position.

3. The method according to claim 1, wherein the online minimization is provided by at least one of a gradient method and a simplex method.

4. The method according to claim 1, wherein the estimated parameters are fed back to the dynamical model.

5. A device for parameter estimation for a self-energized brake mechanism having a moving part, a brake pad, a brake disc, a caliper, and a wedge profile, the device comprising:
  a brake mechanism with one or more measuring devices for state variables;
  a dynamical model for calculating one or more simulated state variables, wherein the dynamical model is based on the equations:

$$\begin{bmatrix} \dot{x}_a \\ \dot{v}_a \end{bmatrix} = \begin{bmatrix} f_1(x) \\ f_2(x,d) \end{bmatrix} + \begin{bmatrix} g_1 \\ g_2 \end{bmatrix} u$$

where state and input coordinate functions are as follows:

$$f_1(x) = v_a,$$
$$f_2(x,d) = \frac{(k_0 v_a \tan\varphi_w + s_0(x_a \tan\varphi_w - \delta))(\mu\cos\varphi_w - \sin\varphi_w)}{m_1},$$
$$g_1 = 0,$$
$$g_2 = \frac{1}{m_1 \cos\varphi_a}$$

a deviation unit for comparing the one or more measured state variables and the one or more simulated state variables, wherein calculated relative deviations are determined in accordance with the equations:

$$\varepsilon_{v_a} = \frac{v_{a_{mes}} - v_{a_{sim}}}{v_{a_{max}}},$$

$$\varepsilon_{x_a} = \frac{x_{a_{mes}} - x_{a_{sim}}}{x_{a_{max}}},$$

and a summed weighted deviation is calculated in accordance with the equation:

$$\epsilon_c = (w_{x_a}\epsilon_{x_a} + w_{v_a}\epsilon_{v_a}); \text{ and}$$

a minimization unit for providing estimated parameter values, wherein minimization is provided by a proportional and an integral portion of the sum deviation:

$$\mu_{n+1} = (P_\mu \epsilon_c + I_\mu \int \epsilon_c dt) + \mu_n,$$

$$\delta_{n+1} = -(P_\delta \delta_c + I_\delta \int \epsilon_c dt) + \delta_n,$$

where P and I are minimization parameters, and estimated parameters are adjusted alternately in time,
  wherein inputs of the brake mechanism and the dynamical model are connected in parallel and outputs of the minimization unit are connected with the dynamical model for feed back,
  wherein the parameters are a friction coefficient and an air gap of the brake pad and the brake disc.

6. The device according to claim 5, wherein the brake mechanism comprises a reconstruction unit for reconstructing speed values from measured position values.

7. The device according to claim 6, wherein the reconstruction unit comprise one of a derivation unit and PLL-filters.

8. The device according to claim 5, wherein the device is part of a brake controller.

* * * * *